(12) United States Patent
Kotani et al.

(10) Patent No.: US 12,027,959 B2
(45) Date of Patent: Jul. 2, 2024

(54) PORTABLE GENERATOR HAVING AXIALLY SPACED COOLING FANS

(71) Applicant: HONDA MOTOR CO., LTD., Tokyo (JP)

(72) Inventors: Takafumi Kotani, Wako (JP); Kana Miyagi, Wako (JP); Wataru Matsuyama, Wako (JP); Masahiro Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/950,384

(22) Filed: Sep. 22, 2022

(65) Prior Publication Data

US 2023/0097819 A1 Mar. 30, 2023

(30) Foreign Application Priority Data

Sep. 28, 2021 (JP) .................. 2021-157862

(51) Int. Cl.
- *H02K 9/06* (2006.01)
- *F01P 5/06* (2006.01)
- *F02B 63/04* (2006.01)
- *H02K 7/18* (2006.01)

(52) U.S. Cl.
CPC ............... *H02K 9/06* (2013.01); *F01P 5/06* (2013.01); *F02B 63/044* (2013.01); *H02K 7/1815* (2013.01)

(58) Field of Classification Search
CPC ........ H02K 5/207; H02K 7/1815; H02K 9/06; F01P 1/02; F01P 2005/025; F01P 5/06; F02B 63/04; F02B 63/044
USPC .................... 290/1 A, 1 B; 310/62
See application file for complete search history.

(56) References Cited

U.S. PATENT DOCUMENTS

| 11,274,620 B2* | 3/2022 | Yamada ........... F02D 17/04 |
| 11,713,711 B2* | 8/2023 | Ineyama ........... H02K 9/04 |
| | | 123/2 |
| 2020/0291882 A1* | 9/2020 | Yamada ........... F02D 41/1453 |
| 2023/0096783 A1* | 3/2023 | Ineyama ........... H02K 5/24 |
| | | 123/2 |

FOREIGN PATENT DOCUMENTS

JP 2020-118127 8/2020

* cited by examiner

*Primary Examiner* — Tulsidas C Patel
*Assistant Examiner* — S. Mikailoff
(74) *Attorney, Agent, or Firm* — Rankin, Hill & Clark LLP

(57) ABSTRACT

In a generator including an engine, a rotating electric machine, and a cooling fan that rotates integrally with a rotor of the rotating electric machine, the cooling fan includes a plurality of fans disposed at an interval in an axial direction of the fan, and a cylindrical body that extends in the axial direction of the cooling fan with a cylindrical cross section in an inner peripheral space of an upstream fan and is disposed more on the upstream side than a downstream fan.

5 Claims, 7 Drawing Sheets

PORTABLE GENERATOR HAVING AXIALLY SPACED COOLING FANS

INCORPORATION BY REFERENCE

The present application claims priority under 35 U.S.C. § 119 to Japanese Patent Application No. 2021-157862 filed on Sep. 28, 2021. The content of the application is incorporated herein by reference in its entirety.

BACKGROUND OF THE INVENTION

Field of the Invention

The present invention relates to a generator.

Description of the Related Art

A generator including an engine, an alternator configuring a rotating electric machine and a cooling fan that rotates integrally with a rotor of the alternator is known. In the generator of this kind, a single cooling fan is provided on an opposite side of the engine across the alternator and the engine or the like is cooled by rotationally driving the cooling fan (for example, see Japanese Patent Laid-Open No. 2020-118127).

In recent years, examples of using a neodymium magnet or the like for a permanent magnet of a rotating electric machine are increasing in order to improve an output density of a generator.

However, a heat value of the rotating electric machine or the like increases accompanying improvement of the output density and a cooling performance is a problem.

The present invention is implemented in consideration of circumstances described above, and it is an object to improve a cooling performance of a generator while suppressing enlargement of a fan.

SUMMARY OF THE INVENTION

In a generator including an engine, a rotating electric machine, and a cooling fan that rotates integrally with a rotor of the rotating electric machine, the cooling fan includes a plurality of fans disposed at an interval in an axial direction of the fan, and a cylindrical body that extends in the axial direction with a cylindrical cross section in an inner peripheral space of an upstream fan positioned on a most upstream side among the plurality of fans, and is disposed more on the upstream side than the fan on a downstream side.

A cooling performance of a generator can be improved while suppressing enlargement of a fan.

DETAILED DESCRIPTION OF THE PREFERRED EMBODIMENT

Figure 1:
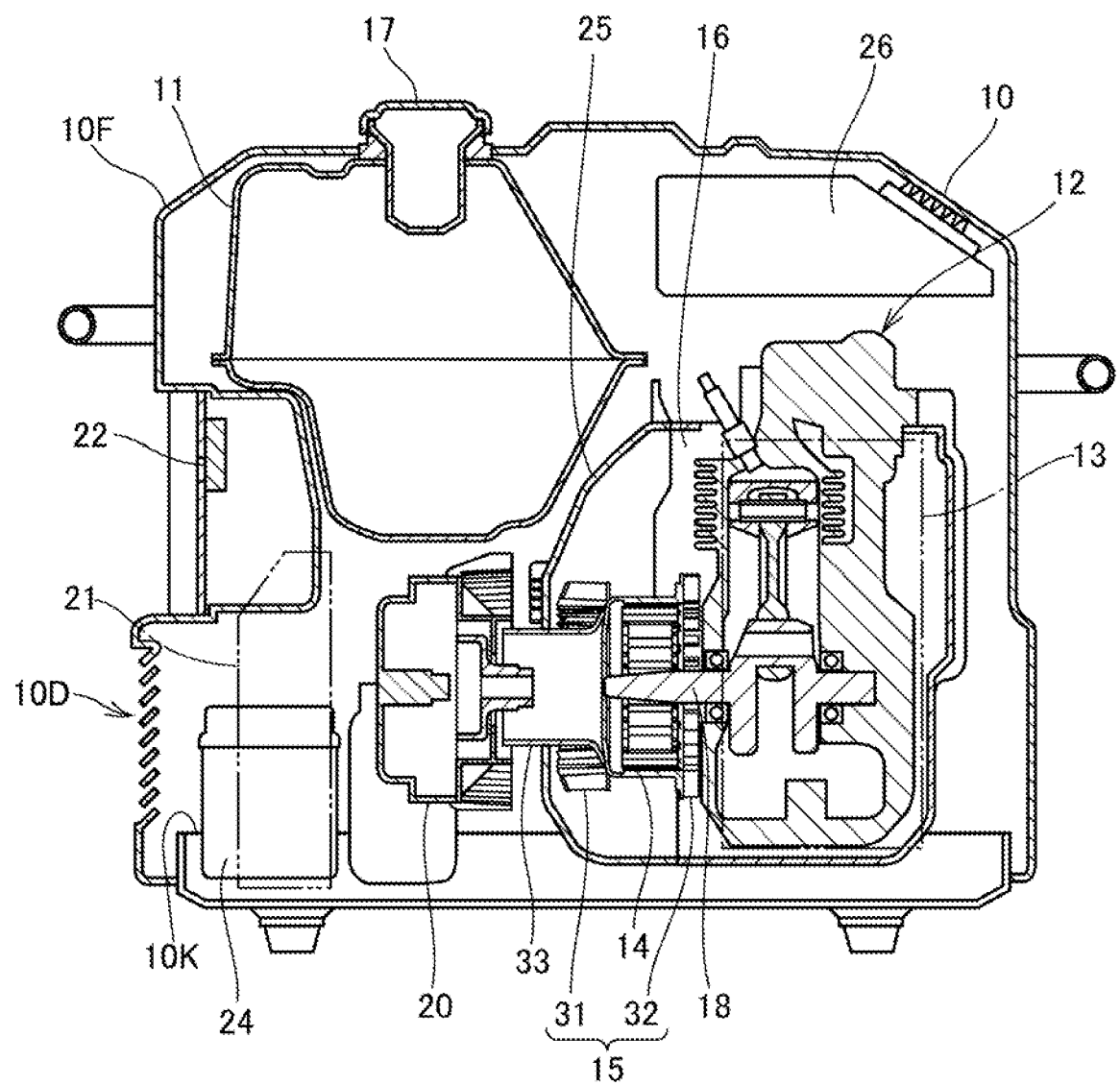
FIG. 1 is a configuration view of a generator according to an embodiment of the present invention.

FIG. 1 is a configuration view of a generator 1.

The generator 1 includes an outer casing 10. Inside the outer casing 10, a fuel tank 11, an engine 12, a muffler 13, an alternator 14, a fan 15, and a shroud 16 are disposed.

The fuel tank 11 includes a fuel inlet that can be accessed from an outside, and fuel can be put into the fuel tank 11 through the fuel inlet. A fuel inlet cap 17 is removably mounted on the fuel inlet.

The engine 12 is an ignition air-cooled engine driven by the fuel inside the fuel tank 11. The engine 12 includes a cylinder, a piston that reciprocates inside the cylinder, and a crankshaft 18 that is coupled to the piston through a connecting rod.

An intake pipe connected to the engine 12 is provided with a throttle valve and a fuel supply device. Air of which the volume is adjusted by the throttle valve and the fuel supplied from the fuel supply device are mixed, and this air-fuel mixture is supplied to the engine 12. The engine 12 combusts the air-fuel mixture in a combustion chamber to drive the piston and thereby rotates the crankshaft 18 through the connecting rod.

The muffler 13 is connected to an outlet of an exhaust pipe connected to the engine 12. The muffler 13 serves purposes such as reducing an exhaust pressure.

The fuel to drive the engine 12 may be gasoline or may be fuel other than gasoline. The fuel supply device may have a configuration using an injector or a configuration using a carburetor.

The generator 1 includes a control unit. The control unit has a processor such as a CPU (Central Processing Unit), and a memory such as a ROM (Read Only Memory). The control unit controls individual parts of the generator 1 as the processor executes programs stored in the memory. The control unit functions as, for example, an ECU (Electronic Control Unit) that outputs control signals for controlling output of the engine 12.

The alternator 14 is mounted to the crankshaft 18 of the engine 12. The alternator 14 is a multipolar alternator that is driven by the engine 12 to generate alternating-current power. The alternator 14 has a rotor 42 that rotates integrally with the crankshaft 18, and a stator 41 that is disposed concentrically with the rotor 42 so as to face a circumferential surface of the rotor 42.

Figure 4:
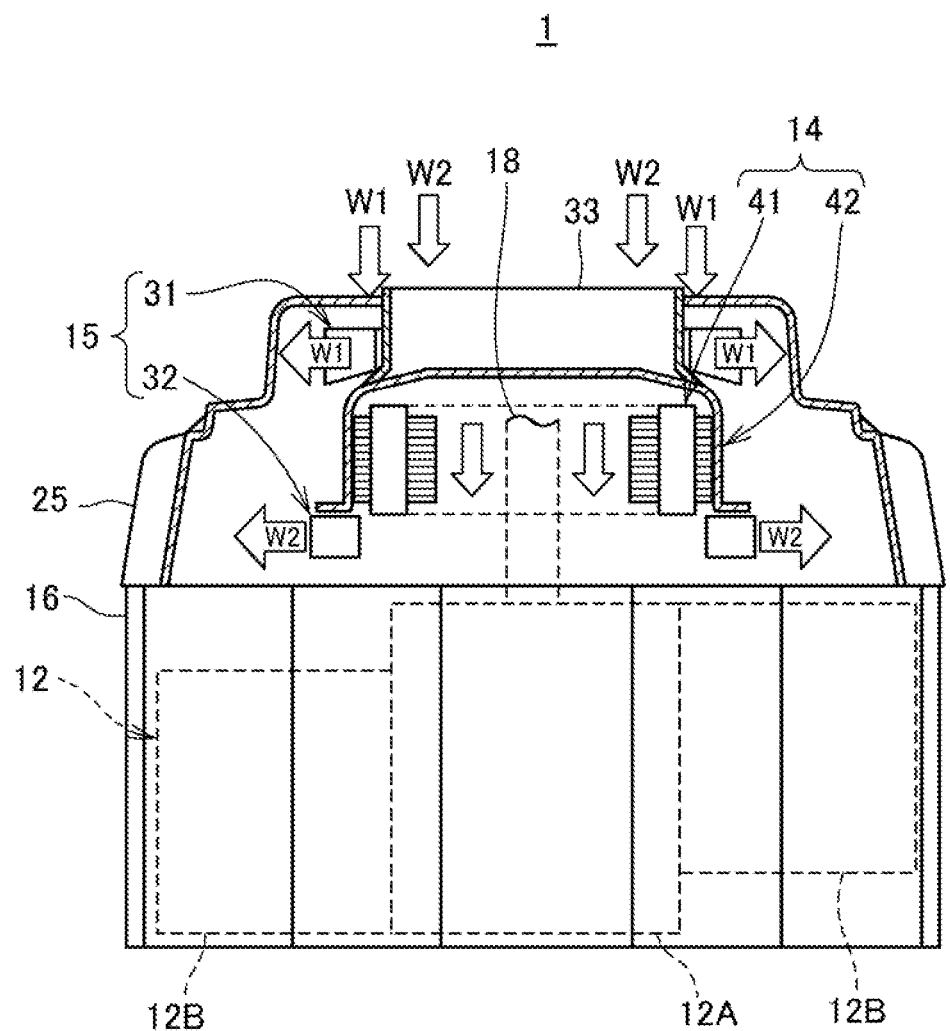
FIG. 4 is a drawing schematically illustrating the present embodiment.

The rotor 42 is provided with a permanent magnet 42M (FIG. 4 to be described later). The stator 41 is provided with U-phase, V-phase, and W-phase windings that are disposed at a phase angle of, for example, 120 degrees to one another.

The fan 15 is also referred to as a cooling fan and is mounted on the crankshaft 18. On the crankshaft 18, a starting device 20 for starting the engine 12 is disposed. When the engine 12 is driven, power is generated by the alternator 14. When the engine 12 is driven, the fan 15 rotates, sending cooling air to the engine 12. The alternator 14 generates alternating-current power.

The shroud 16 includes a ventilation opening through which air is taken in. The shroud 16 guides the air sent by the fan 15 to the periphery of the engine 12.

The outer casing 10 includes an intake port 10K through which outside air is taken in and an exhaust port through which air having cooled the engine 12 is discharged.

The generator 1 includes an inverter 21. The inverter 21 controls a voltage and a frequency of the alternating-current power generated by the alternator 14 so as to stabilize the output.

The generator 1 further includes a control panel 22. The control panel 22 is provided with an electrical outlet, operating switches, and others.

The electrical outlet is supplied with alternating-current power from the inverter 21. A plug of a device that uses generated power is connected to the electrical outlet. Alternatively, the electrical outlet may be supplied with direct-current power.

The outer casing 10 includes a removable front cover 10F. The front cover 10F is a cover that covers a front surface of the generator 1 and is also a cover that exposes the control panel 22 to the outside.

The intake port 10K through which the outside air is taken in is provided on a lower part of the front cover 10F. The intake port 10K is formed at an opening opened toward the front of the generator 1 at the lower part of the front cover 10F, and is covered by a lid member 10D including a louver so as to freely take in the air. The outside air straightened by the louver is taken in from the intake port 10K as the cooling air.

On an inner side of the intake port 10K, the inverter 21 is disposed. On the side (a page depth direction in FIG. 1) of the inverter 21, a battery 24 that supplies operating power to the starting device 20 or the like is disposed.

The fan 15 is covered by a fan cover 25. The fan cover 25 is formed in such a shape that an end on the side of the front cover 10F is opened and a diameter is increased toward the engine 12. The cooling air which is made to flow into the fan cover 25 through the intake port 10K by the fan 15 flows into the shroud 16 surrounding the periphery of the engine 12.

The shroud 16 is a cooling air path sectioning body that sections a cooling air path through which the cooling air is made to flow around the engine 12, and also functions as a noise reducing member that reduces noise transmitted from the engine 12 to the outside and a heat influence reducing member that reduces heat influence from the engine 12 onto the surrounding members or the like. The fan cover 25 and the shroud 16 are formed of a resin material for example, but may not be limited to the resin material.

The cooling air having cooled the engine 12 passes around the muffler 13 and is discharged through a silencing chamber 26 to the outside. The silencing chamber 26 is provided above the engine 12 and the muffler 13.

Figure 2:
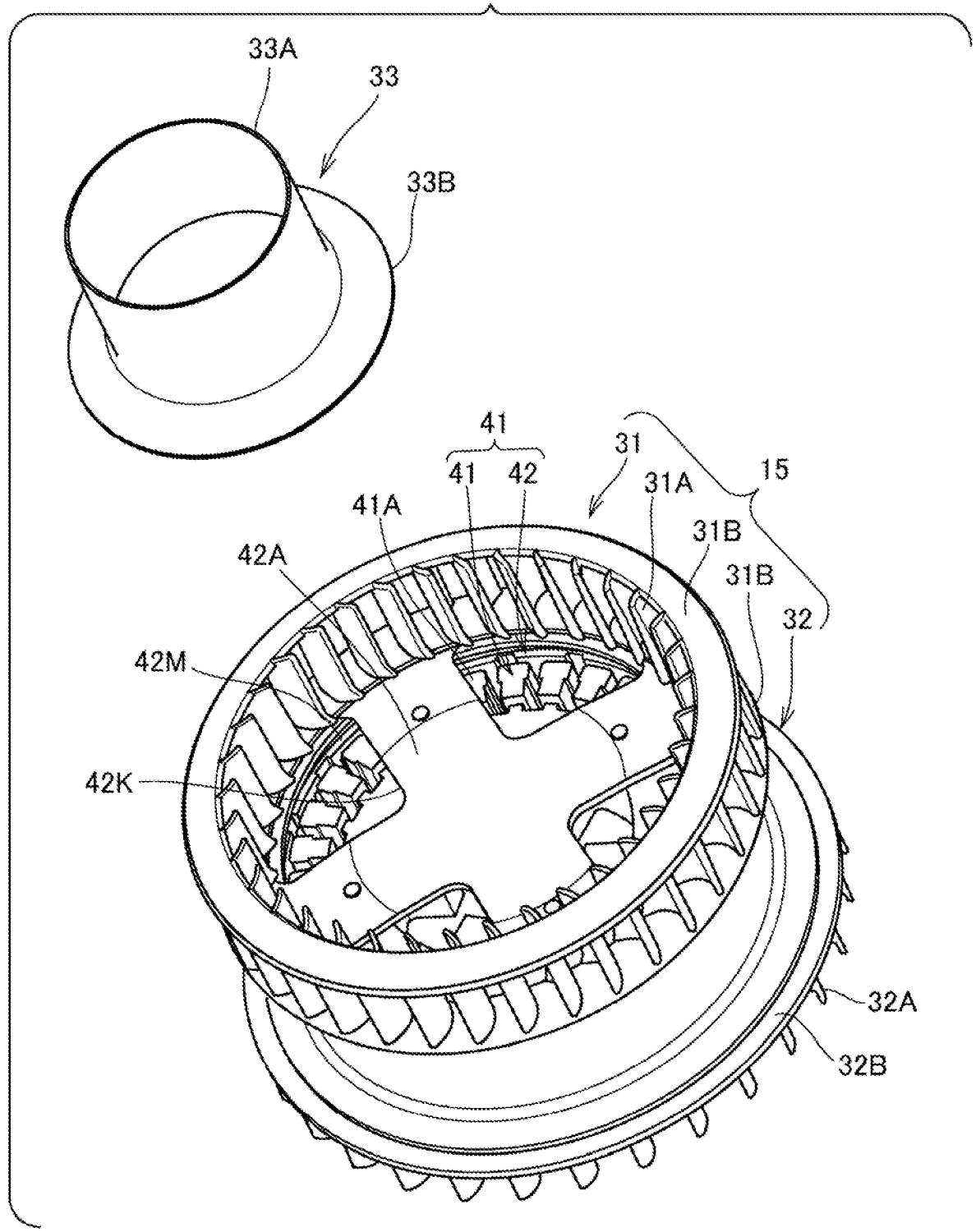
FIG. 2 is a perspective view illustrating a fan together with an alternator.
Figure 3:
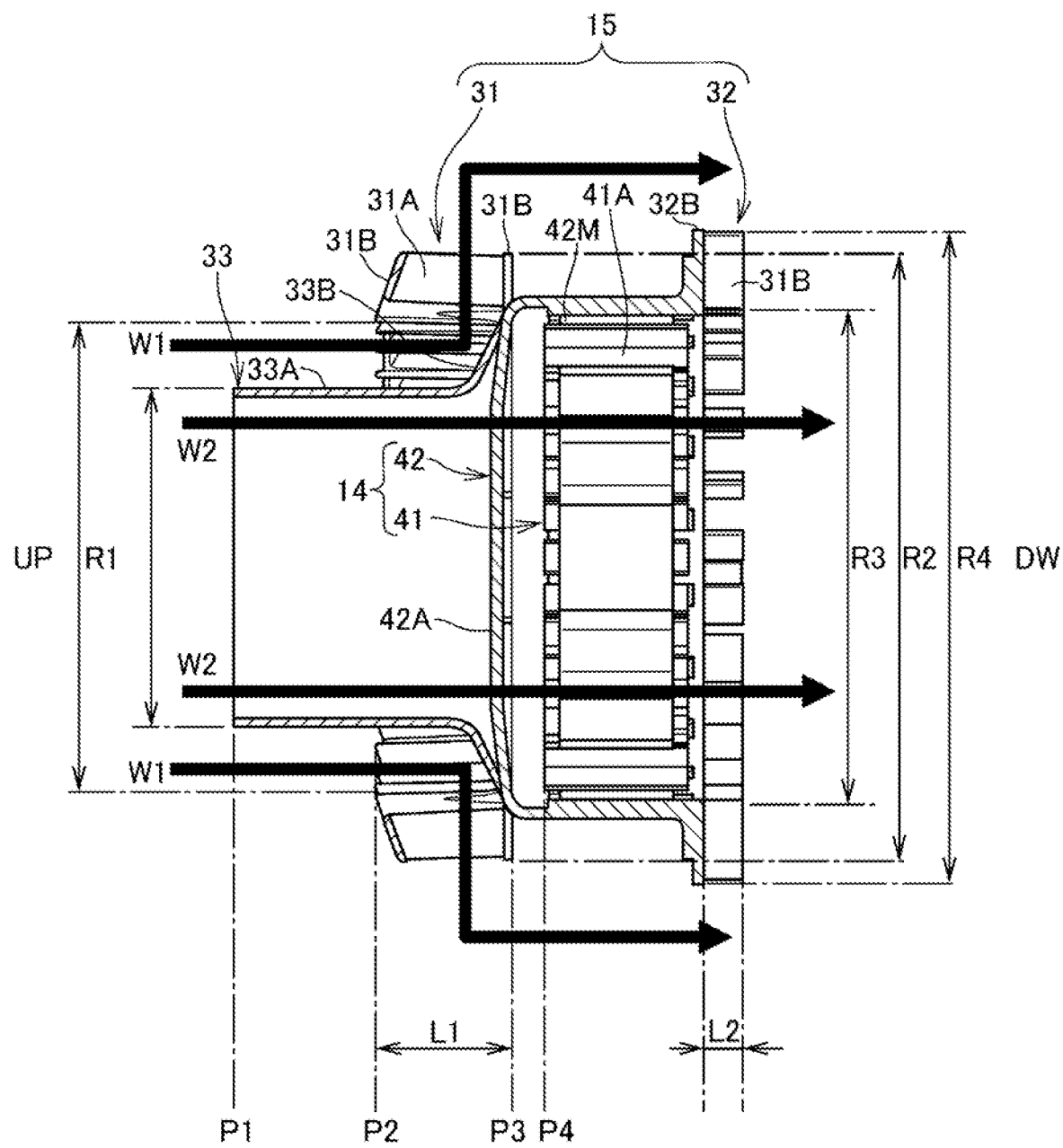
FIG. 3 is a sectional side elevation view illustrating the fan together with the alternator.

FIG. 2 is a perspective view illustrating the fan 15 together with the alternator 14. FIG. 3 is a sectional side elevation view illustrating the fan 15 together with the alternator 14.

As illustrated in FIG. 2 and FIG. 3, the fan 15 includes a plurality (two, in the present embodiment) of fans 31 and 32 lined in an axial direction of the fan 15. Hereinafter, the fan 31 positioned on a relatively upstream side of the cooling air is described as an "upstream fan 31" and the fan 32 positioned on a relatively downstream side is described as a "downstream fan 32".

In an inner peripheral space of the upstream fan 31, a cylindrical guide body 33 formed of a cylindrical body that is in a cylindrical (tube) shape and that extends in the axial direction of the fan 15 with a cylindrical cross section is provided.

The alternator 14 includes the stator 41 disposed relatively freely rotatably and coaxially with the crankshaft 18 corresponding to an output shaft of the engine 12, and the rotor 42 (also referred to as an outer rotor) that rotates integrally with the crankshaft 18. The alternator 14 may be referred to as an outer rotor type rotating machine for which the stator 41 is disposed on an inner periphery of the rotor 42, and an outer rotor type rotating electric machine.

The upstream fan 31 and the downstream fan 32 are formed as the cooling fan that rotates integrally with the rotor 42, and in other words, formed as the cooling fan that rotates integrally with the rotating electric machine.

The stator 41 includes a stator core provided with slots 41A at an interval in a circumferential direction based on an axial center (that coincides with a position of the crankshaft 18) of the stator 41, and a coil is mounted on each slot 41A. In the present description, the circumferential direction corresponds to the circumferential direction of the crankshaft 18, and coincides with the circumferential direction of the stator 41, the circumferential direction of the rotor 42 and the circumferential direction of the alternator 14.

The rotor 42 includes a bowl-shaped rotor main body 42A where the permanent magnet 42M is disposed along an annular track surrounding the stator 41. The alternator 14 outputs an induced current generated at the stator 41 accompanying rotations of the rotor 42 to the outside through a non-illustrated cable.

As illustrated in FIG. 2, the rotor main body 42A includes a plurality of openings 42K that function as cooling air inlets through which the air around the rotor 42 is taken into the stator 41. The openings 42K are provided at equal angles along the circumferential direction of the rotor 42 to cool the slots 41A and the coils with the cooling air by the fan 31.

The upstream fan 31 is a blade fan that is positioned at an outer peripheral part to the rotor main body 42A and on an opposite side of the engine 12 and includes blades 31A (also referred to as fan blades) disposed at an interval in the circumferential direction. That is, the upstream fan 31 is positioned on the upstream side of the cooling air relative to the alternator 14.

The individual blades 31A are provided between a pair of front and rear annular plate members 31B at an interval in the axial direction of the upstream fan 31.

FIG. 3 schematically illustrates flow of cooling air W1 and W2 generated by the rotations of the upstream fan 31 and the downstream fan 32. The cooling air W1 illustrates the cooling air flowing on an outer peripheral side (corresponding to the outer peripheral side of the rotor 42) of the alternator 14, and the cooling air W2 illustrates the cooling air flowing on an inner peripheral side (corresponding to an inner peripheral side of the rotor 42) of the alternator 14. In FIG. 3, in order to make an explanation easy to understand, the upstream side of the cooling air W1 and W2 is denoted by a sign UP, and the downstream side of the cooling air W1 and W2 is denoted by a sign DW. On the downstream side DW of the cooling air W1 and W2, the engine 12 is disposed.

When it is needed to specially distinguish and describe the cooling air W1 and W2, the cooling air is described as first cooling air W1 and second cooling air W2 respectively.

As illustrated in FIG. 3, the flow of the first cooling air W1 is formed as the upstream fan 31 sends the air around the fan 31 in a centrifugal direction. The first cooling air W1 cools the engine 12 by flowing toward the engine 12. That is, the upstream fan 31 functions as a fan mainly for cooling the engine.

By the first cooling air, a cylinder part that reaches a high temperature in particular of the engine 12 can be suitably cooled, an outer peripheral surface of the rotor 42 can be cooled and an outer peripheral part of the alternator 14 (for example, an outer peripheral part of the permanent magnet 42M that reaches a relatively high temperature) can be cooled.

The pair of front and rear plate members 31B that the upstream fan 31 has function as guides that guide the cooling air W1 in the centrifugal direction in addition to functioning as support members that support the individual blades 31A. By the plate members 31B, the cooling air W1 is sent to a position separated from the crankshaft 18 in a radial direction and the cylinder part can be effectively cooled.

The downstream fan 32 is a blade fan that is positioned at the outer peripheral part to the rotor main body 42A and on the side of the engine 12, and includes blades 32A (also referred to as fan blades) disposed at an interval in the circumferential direction. That is, the downstream fan 32 is positioned on the downstream side of the cooling air relative to the alternator 14. The individual blades 32A extend to the side of the engine 12 from an annular plate member 32B of which the diameter is increased from a rear end of the rotor main body 42A.

As illustrated in FIG. 3, the flow of the second cooling air W2 is formed as the downstream fan 32 sends the air around the fan 32 in the centrifugal direction. The second cooling air W2 cools an inner peripheral part of the rotor 42 and the stator 41 by flowing into the individual openings 42K of the rotor main body 42A. That is, the downstream fan 32 functions as a fan mainly for cooling the alternator.

By the second cooling air W2, the inner peripheral part of the permanent magnet 42M that reaches a relatively high temperature in the alternator 14 and the stator 41 can be cooled. In addition, the second cooling air W2 flows to a region around the crankshaft 18 positioned on the downstream side of the alternator 14 so that the second cooling air W2 can also cool a crankcase of the engine 12.

In FIG. 3, an inner diameter of the upstream fan 31 is denoted by a sign R1 and an outer diameter is denoted by a sign R2. In addition, the inner diameter of the downstream fan 32 is denoted by a sign R3 and the outer diameter is denoted by a sign R4. In an illustrated example, a relation is R1<R3<R2<R4, however, it is not limited to the relation.

In FIG. 3, a front-rear length of the upstream fan 31 is denoted by a sign L1 and a front-end length of the downstream fan 32 is denoted by a sign L2. In the illustrated example, the relation is L1>L2, however, it is not limited to the relation.

Outer diameter sizes and front-rear lengths of the upstream fan 31 and the downstream fan 32 are controlled by a free space around the individual fans 31 and 32 or the like.

In recent years, it is conceivable to use a rare-earth based sintered magnet such as a neodymium magnet for the permanent magnet 42M of the alternator 14 in order to improve an output density of the generator and to adopt a multi-cylinder engine in order to reduce noise and vibrations while obtaining high output.

However, since a heat value of the alternator 14 and a heat value of the engine 12 increase, it is needed to improve a cooling performance. When the fan 15 is enlarged in order to improve the cooling performance, a situation where the fan 15 cannot be disposed in a limited space, a situation where energy loss of the engine 12 accompanying fan drive increases, being disadvantageous for power generation efficiency, and a situation of being disadvantageous for noise reduction or the like occur.

Then, in the present configuration, by providing the cylindrical guide body 33 illustrated in FIG. 2 in the inner peripheral space of the upstream fan 31, the space where the second cooling air W2 flows is turned to the space where influence of the rotations of the upstream fan 31 is suppressed, and it is made possible to increase at least the second cooling air W2 without enlarging the fan 15.

As illustrated in FIG. 2 and FIG. 3, the cylindrical guide body 33 integrally includes a guide body main body 33A in a circular cylindrical shape that extends in the axial direction of the fan 15 with a perfect circle cross section of the same diameter and a diameter increased part 33B of which the diameter is increased at the end of the guide body main body 33A, and is formed of a metal material or a resin material.

By mounting the diameter increased part 33B on the rotor body 42A of the alternator 14, the cylindrical guide body 33 is fixed to the alternator 14 and the fan 15. In FIG. 3, a front end position of the cylindrical guide body 33 is denoted by a sign P1, a front end position of the upstream fan 31 is denoted by a sign P2, a rear end position of the cylindrical guide body 33 is denoted by a sign P3, and a front end position of the stator 41 is denoted by a sign P4.

The front end position P1 of the cylindrical guide body 33 is positioned more at the front (corresponding to the upstream side of the cooling air W1 and W2) than the front end position P2 of the upstream fan 31. According to the configuration, the situation where a pressure inside the cylindrical guide body 33 is lowered by the rotations of the upstream fan 31 can be effectively suppressed, and the situation where the pressure outside the cylindrical guide body 33 is lowered by the rotations of the downstream fan 32 can be also suppressed.

In addition, the cooling air W1 and W2 can be distributed to the outer peripheral side and the inner peripheral side of the cylindrical guide body 33 at a position more on the upstream side than the upstream fan 31. Thus, the cooling air W1 can be smoothly guided to the upstream fan 31 by an outer peripheral surface of the cylindrical guide body 33, and the cooling air W2 can be smoothly guided to the downstream fan 32 by an inner peripheral surface of the cylindrical guide body 33. Accordingly, it becomes possible to make the cooling air W1 and W2 efficiently flow.

The rear end position P3 of the cylindrical guide body 33 is positioned more at the front than the front end position P4 of the stator 41. According to the configuration, the situation where the cylindrical guide body 33 obstructs cooling of the inner peripheral part of the alternator 14 by the cooling air W2 is easily avoided. Further, since the diameter at the rear end of the cylindrical guide body 33 is increased to the inner diameter R1 of the upstream fan 31 as illustrated in FIG. 3, the cooling air W2 can be guided to a wide range of the inner peripheral part of the alternator 14 and the inner peripheral part of the alternator 14 is easily and effectively cooled.

Accordingly, it becomes possible to improve the cooling performance of the generator 1 without enlarging the upstream fan 31 and the downstream fan 32. By not enlarging the fans 31 and 32, loads of the engine 12 needed for the rotations of the fans 31 and 32 are suppressed and it becomes advantageous for improving the power generation efficiency and reducing noise.

Note that a position relation of the individual positions P1-P4 may be appropriately changed within a range where a cooling effect by the cooling air W1 and/or the cooling air W2 can be increased compared to the case of not providing the cylindrical guide body 33. For example, the front end position P1 of the cylindrical guide body 33 may not be more at the front than the front end position P2 of the upstream fan 31.

Further, by the cylindrical guide body 33, heat influence from the inner peripheral part of the alternator 14 onto the upstream fan 31 can be reduced. Thus, a resin fan advantageous for cost reduction and weight reduction can be used for the upstream fan 31.

Note that it is preferable to use a fan of a highly heat-resistant material such as a metal for the downstream fan 32. However, the resin fan advantageous for the cost reduction and the weight reduction may be used also for the downstream fan 32 in the range of providing a sufficient heat resistant performance.

Next, the present embodiment and comparative examples 1-4 will be explained.

FIG. 4 is a drawing schematically illustrating the fan 15 of the generator 1 of the present embodiment together with a peripheral configuration. FIG. 4 schematically illustrates the configuration illustrated in FIG. 1-FIG. 3 described above.

In the present embodiment, the engine 12 is a V-twin air-cooled engine including a crankcase 12A and two cylinder parts 12B disposed at a predetermined narrow angle. When such a multi-cylinder engine is adopted, low noise and low vibrations are more easily achieved while obtaining the high output compared to the case of adopting a single cylinder engine of low displacement. On the other hand, as the high output is obtained, the heat values of the engine 12 and the alternator 14 increase and the high cooling performance is desired.

As illustrated in FIG. 4, the fan 15 of the present embodiment sends the first cooling air W1 in the centrifugal direction by the upstream fan 31 so that the individual cylinder parts 12B of the engine 12 can be cooled by the cooling air W1 through the fan cover 25 and the shroud 16.

In addition, the fan 15 makes the second cooling air W2 flow to the inner peripheral part of the alternator 14 by the downstream fan 32 so that the inner peripheral part of the rotor 42 and the stator 41 are cooled and the crankcase 12A can be also cooled.

In the present embodiment, since the cylindrical guide body 33 is provided, the first cooling air W1 can be made to efficiently flow to effectively cool the individual cylinder parts 12B of the engine 12. Further, since the influence of the upstream fan 31 on the second cooling air W2 can be avoided by the cylindrical guide body 33, the second cooling air W2 is made to efficiently flow to effectively cool the inner peripheral part of the rotor 42, the stator 41 and the crankcase 12A.

Accordingly, the sufficient cooling performance is easily secured without enlarging the fan 15 even when the heat value of the alternator 14 and the heat value of the engine 12 increase.

Figure 5:
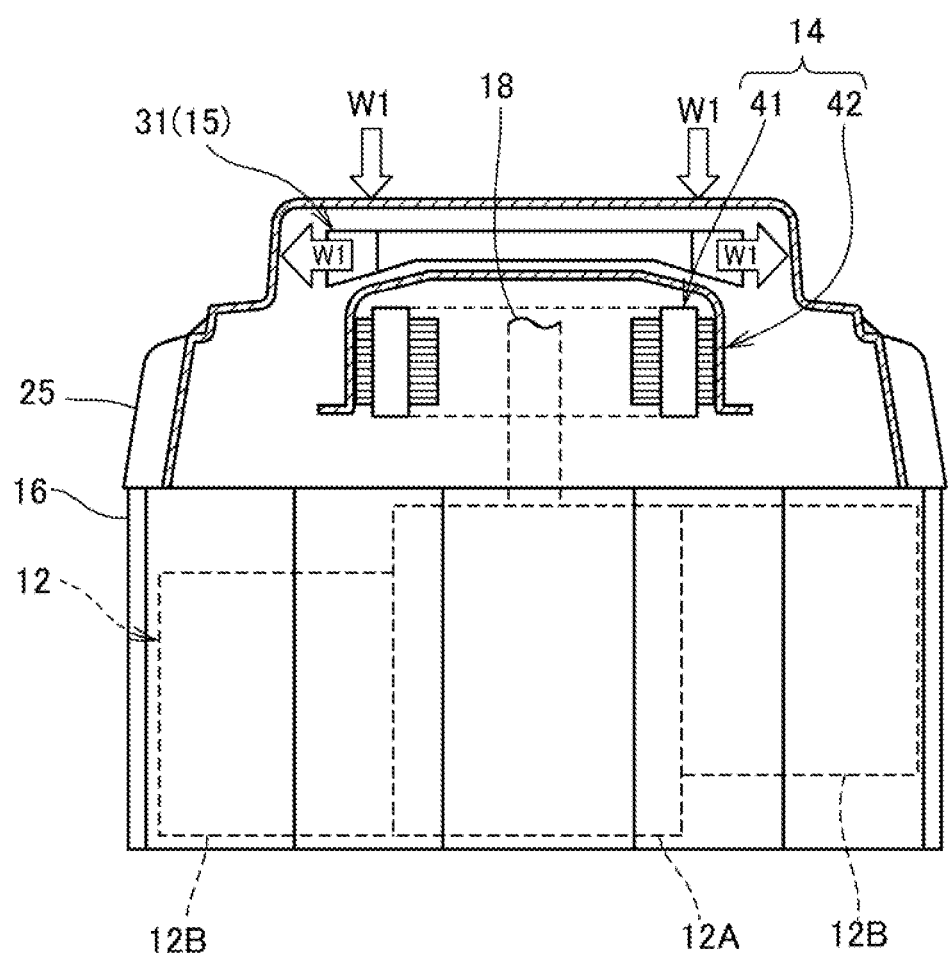
FIG. 5 is a drawing schematically illustrating a comparative example 1.

FIG. 5 is a drawing schematically illustrating the fan 15 of a generator 1A of the comparative example 1 together with the peripheral configuration. The fan 15 of the generator 1A is configured such that the downstream fan 32 and the cylindrical guide body 33 are excluded from an embodiment 1.

Since the generator 1A includes the fan 15 (corresponding to the upstream fan 31) only at a distal end of the rotating electric machine formed of the alternator 14, the air is just stirred on the inner side (the inner peripheral part of the rotor 42) of the rotating electric machine, and positive cooling cannot be performed.

When the heat value of the alternator 14 and the heat value of the engine 12 increase, it is needed to enlarge the fan 15 in order to increase the stirring action described above. When the fan 15 is enlarged, the situation where the fan 15 cannot be disposed in the limited space, the situation of being disadvantageous for power generation efficiency improvement and the situation of being disadvantageous for the noise reduction or the like occur.

Figure 6:
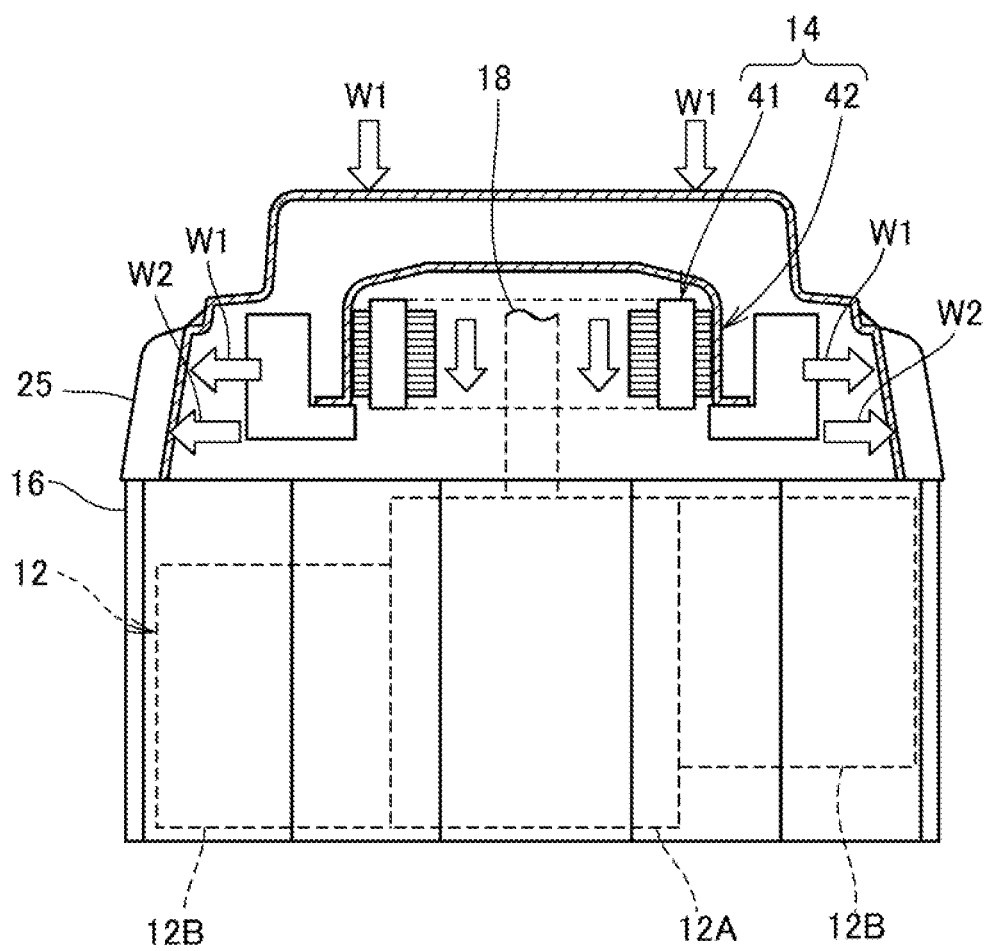
FIG. 6 is a drawing schematically illustrating a comparative example 2.

FIG. 6 is a drawing schematically illustrating the fan 15 of a generator 1B of the comparative example 2. The fan 15 of the generator 1B is configured such that a fan that is disposed on the outer periphery of the alternator 14 and generates the first cooling air W1 and a fan that generates the second cooling air W2 are connected. In the configuration, the outer diameter of the fan 15 tends to become large. When the heat value of the alternator 14 and the heat value of the engine 12 increase, the diameter of the fan 15 is increased more in order to increase an air blowing amount, and it is possible that the energy loss needed for the rotations of the fan 15 increases and the noise of the fan 15 also increases.

Figure 7:
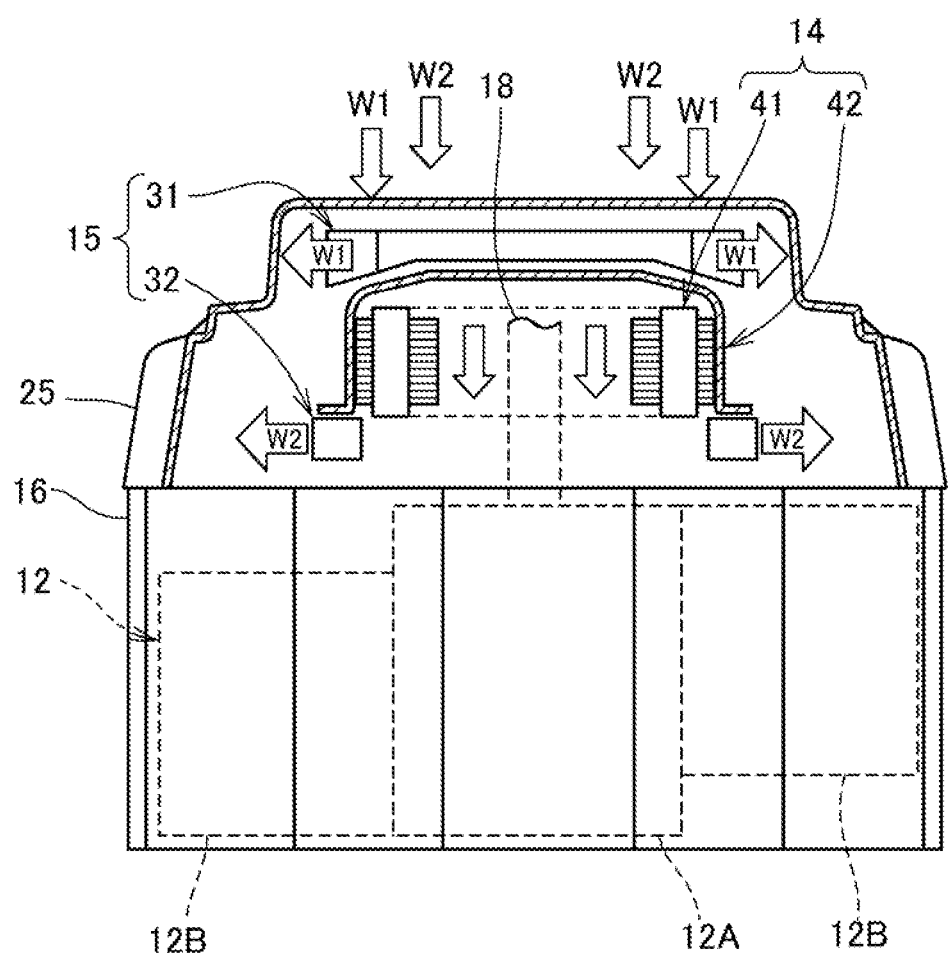
FIG. 7 is a drawing schematically illustrating a comparative example 3.

FIG. 7 is a drawing schematically illustrating the fan 15 of a generator 1C of the comparative example 3 together with the peripheral configuration. The fan 15 of the generator 1C is configured such that the cylindrical guide body 33 is excluded from the embodiment 1.

When only the upstream fan 31 and the downstream fan 32 are provided, the pressure at the inner peripheral center of the upstream fan 31 is lowered by the rotations of the upstream fan 31 and an air volume of the second cooling air W2 is reduced so that the inner peripheral part of the alternator 14 cannot be effectively cooled. Accordingly, when the heat value of the alternator 14 and the heat value of the engine 12 increase, at least a cooling amount for the inner peripheral part of the alternator 14 becomes insufficient or the downstream fan 32 or the like needs to be enlarged.

As described above, the fan 15 of the generator 1 of the present embodiment includes the upstream fan 31 and the downstream fan 32 disposed at an interval in the axial direction of the fan 15, and the cylindrical guide body 33 formed of the cylindrical body that extends in the axial direction of the fan 15 with the cylindrical cross section in the inner peripheral space of the upstream fan 31 and is disposed more on the upstream side than the downstream fan 32.

According to the configuration, the cooling performance of the generator 1 can be improved while suppressing enlargement of the fan 15.

In addition, since the upstream fan 31 and the cylindrical guide body 33 are positioned on the upstream side of the alternator 14 configuring the rotating electric machine, the diameter of the fan 15 is easily reduced compared to the case of disposing the upstream fan 31 on the outer periphery of the alternator 14. In addition, the situation where the pressure at the inner peripheral part center of the upstream fan 31 is lowered is avoided by the cylindrical guide body 33 and the inner peripheral part of the alternator 14 is easily cooled by the downstream fan 32. Further, the heat influence from the inner peripheral part of the alternator 14 to the upstream fan 31 is avoided, and a resin fan advantageous for the cost reduction and the weight reduction can be used for the upstream fan 31.

Since the downstream fan 32 is positioned on the downstream side of the alternator 14, the cooling air W2 is easily and sufficiently made to flow to the inner peripheral part of the alternator 14 by the cylindrical guide body 33 and the downstream fan 32.

In addition, since the cylindrical guide body 33 extends more on the upstream side than the upstream fan 31, the situation where the pressure at the inner peripheral center of the upstream fan 31 is lowered can be effectively suppressed, and the inner peripheral part of the alternator 14 is easily and sufficiently cooled by the second cooling air W2.

Further, since the cylindrical guide body 33 is in the circular cylindrical shape, the cooling air W2 is easily and equally made to flow toward the inner peripheral part of the alternator 14. Accordingly, the cooling air W2 is easily and appropriately made to flow into the openings 42K (see FIG. 2) provided on the inner peripheral part of the alternator 14, and rotation balance is easily attained.

In addition, the upstream fan 31 is a fan mainly for cooling the engine and the downstream fan 32 is a fan mainly for cooling the alternator. Accordingly, the engine 12 and the alternator 14 to be a heat source are easily and appropriately cooled, and the generator 1 can be effectively cooled.

The embodiment described above is just one embodiment of the present invention, and arbitrary modifications and applications are possible without deviating from the gist of the present invention. For example, while the case where the cooling fan 15 includes the two fans 31 and 32 has been explained, the configuration is not limited to that. For example, depending on the free space in the generator 1, three or more fans may be provided at an interval in the axial direction of the fan 15. Even in this case, by disposing a cylindrical body formed of the cylindrical guide body 33 in the inner peripheral space of the fan positioned on the most upstream side, the inner peripheral part of the rotating electric machine is easily and effectively cooled by the fan on the downstream side. The fan on the downstream side may be appropriately disposed around the rotating electric machine according to the free space around the rotating electric machine.

In addition, while the case of applying the present invention to the generator 1 illustrated in FIG. 1 or the like has been explained, the present invention may be applied to the generators of various types that are widely distributed, without being limited to the case. For example, the present invention may be applied to the generator including an inner rotor type alternator, or the present invention may be applied to the generator including the rotating electric machine other than the alternator.

[Configurations Supported by Embodiment Described Above]

The embodiment described above supports the following configurations.

(Configuration 1) A generator including an engine, a rotating electric machine, and a cooling fan that rotates integrally with a rotor of the rotating electric machine, wherein the cooling fan includes a plurality of fans disposed at an interval in an axial direction of the fan, and a cylindrical body that extends in the axial direction with a cylindrical cross section in an inner peripheral space of an upstream fan positioned on a most upstream side among the plurality of fans, and is disposed more on the upstream side than the fan on a downstream side.

According to the configuration, the cooling performance of the generator can be improved while suppressing the enlargement of the cooling fan.

(Configuration 2) The generator according to configuration 1, wherein the upstream fan and the cylindrical body are positioned on the upstream side of the rotating electric machine.

According to the configuration, while making it easy to reduce the diameter of the cooling fan, the situation where the pressure at the inner peripheral part center of the upstream fan is lowered is avoided by the cylindrical body, and the inner peripheral part of the rotating electric machine is easily cooled by the downstream fan. Further, the heat influence from the inner peripheral part of the rotating electric machine to the upstream fan is easily avoided.

(Configuration 3) The generator according to configuration 2, wherein the fan on the downstream side is positioned on the downstream side of the rotating electric machine.

According to the configuration, by the cylindrical fan on the downstream side, the cooling air is easily and sufficiently made to flow to the inner peripheral part of the rotating electric machine.

(Configuration 4) The generator according to any one of configurations 1-3, wherein the cylindrical body extends more on the upstream side than the upstream fan.

According to the configuration, the situation where the pressure at the inner peripheral center of the upstream fan is lowered can be suppressed and the inner peripheral part of the rotating electric machine is easily and sufficiently cooled by the fan on the downstream side.

(Configuration 5) The generator according to any one of configurations 1-4, wherein the cylindrical body is in a circular cylindrical shape.

According to the configuration, the cooling air is easily and equally made to flow toward the inner peripheral part of the rotating electric machine and the rotation balance is easily attained.

(Configuration 6) The generator according to any one of configurations 1-5, wherein the upstream fan is a fan mainly for cooling the engine, and the fan on the downstream side is a fan mainly for cooling the rotating electric machine.

According to the configuration, the engine and the rotating electric machine to be a heat source are easily and appropriately cooled and the generator can be effectively cooled.

REFERENCE SIGNS LIST 1, 1A, 1B, 1C generator
10 outer casing
10D lid member
10F front cover
10K intake port
11 fuel tank
12 engine
12A crankcase
12B cylinder part
13 muffler
14 alternator (rotating electric machine)
15 fan (cooling fan)
16 shroud
18 crankshaft
20 starting device
21 inverter
22 control panel
24 battery
25 fan cover
26 silencing chamber
31 upstream fan
31A, 32A blade
31B, 32B plate member
32 downstream fan
33 cylindrical guide body
33A guide body main body
33B diameter increased part
41 stator
42 rotor
W1 first cooling air
W2 second cooling air

What is claimed is:

1. A generator comprising:
    an engine,
    a rotating electric machine, and
    a cooling fan that is rotatably driven by the engine and rotates integrally with a rotor of the rotating electric machine, said cooling fan having an upstream side and a downstream side and extending in an axial direction,
    wherein the cooling fan includes an upstream fan disposed on the upstream side of the cooling fan and a downstream fan disposed on the downstream side of the cooling fan, wherein said upstream fan defines an inner peripheral space, and
    a cylindrical guide body that extends in the axial direction of the cooling fan, said cylindrical guide body having a cylindrical body that is disposed in the inner peripheral space of the upstream fan, and wherein said cylindrical guide body extends in the axial direction away from the downstream fan.

2. The generator according to claim 1, wherein the rotating electric machine has an upstream side and a downstream side, and wherein the upstream fan and the cylindrical body are positioned on the upstream side of the rotating electric machine.

3. The generator according to claim 2, wherein the downstream fan is positioned on the downstream side of the rotating electric machine.

4. The generator according to claim 1, wherein, on the upstream side of the cooling fan, the cylindrical guide body extends away from the upstream fan.

5. The generator according to claim 1, wherein
    the upstream fan serves to cool the engine, and
    the downstream fan serves to cool the rotating electric machine.

* * * * *